(12) United States Patent
Yokoe et al.

(10) Patent No.: US 9,976,654 B2
(45) Date of Patent: May 22, 2018

(54) VALVE DEVICE

(71) Applicant: NIDEC SANKYO CORPORATION, Nagano (JP)

(72) Inventors: Satoru Yokoe, Nagano (JP); Akihiro Ito, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days. days.

(21) Appl. No.: 15/324,728

(22) PCT Filed: Jul. 22, 2015

(86) PCT No.: PCT/JP2015/070761
§ 371 (c)(1),
(2) Date: Jan. 9, 2017

(87) PCT Pub. No.: WO2016/021406
PCT Pub. Date: Feb. 11, 2016

(65) Prior Publication Data
US 2017/0198817 A1 Jul. 13, 2017

(30) Foreign Application Priority Data
Aug. 7, 2014 (JP) ................. 2014-161188

(51) Int. Cl.
*F16K 3/08* (2006.01)
*F16K 31/04* (2006.01)
*F16K 31/53* (2006.01)

(52) U.S. Cl.
CPC ............ *F16K 3/085* (2013.01); *F16K 31/041* (2013.01); *F16K 31/535* (2013.01)

(58) Field of Classification Search
CPC . F25B 41/04; F16K 3/085; F16K 3/08; F16K 31/041; F16K 31/535;
(Continued)

(56) References Cited

U.S. PATENT DOCUMENTS 1,911,044 A * 5/1933 Thrasher ................... F16K 3/34
137/614.11
3,092,142 A * 6/1963 Willson .................. F16K 3/085
137/614.11
(Continued)

FOREIGN PATENT DOCUMENTS

EP 1406036 4/2004
JP 2000346227 12/2000
(Continued)

OTHER PUBLICATIONS

"International Search Report (Form PCT/ISA/210)", dated Oct. 20, 2015, with English translation thereof, pp. 1-4.
(Continued)

*Primary Examiner* — Eric Keasel
(74) *Attorney, Agent, or Firm* — JCIPRNET

(57) ABSTRACT

A valve device including: a drive source; a base having a valve seat surface in which a fluid inflow hole and outflow hole are formed; a case body covering the valve seat surface-side of the base, and a valve chamber together with the base; a first valve body for opening and closing the outflow hole; and a second valve body for opening and closing the inflow hole is provided. The output part of the drive source, the first and second valve bodies are housed in the valve chamber. The first valve body is a substantially cylindrical member, one end surface of which is in sliding contact with the peripheral edge of the outflow hole in the valve seat surface, receives the driving force of the drive source and pivots such that the outflow hole is switched between a closed state and a fully or partially opened state.

12 Claims, 8 Drawing Sheets

(58) Field of Classification Search
CPC ............... F16K 11/074; F16K 11/0743; Y10T 137/87096; Y10T 137/87981; Y10T 137/86509; Y10T 137/86517; Y10T 137/86533
USPC ..... 137/637, 614.11, 625.12, 625.13, 625.15
See application file for complete search history.

(56) References Cited

U.S. PATENT DOCUMENTS

| | | | | |
|---|---|---|---|---|
| 4,098,294 | A * | 7/1978 | Woods | ............... F15D 1/00 137/614.11 |
| 6,918,408 | B2 * | 7/2005 | Hara | ............... F16K 11/165 137/597 |
| 6,926,250 | B1 * | 8/2005 | Hashimoto | ........... F16K 11/074 251/129.11 |
| 2003/0150495 | A1 | 8/2003 | Hara | |
| 2004/0025534 | A1 | 2/2004 | Ozawa et al. | |
| 2007/0040138 | A1 | 2/2007 | Sekiya et al. | |

FOREIGN PATENT DOCUMENTS

| | | |
|---|---|---|
| JP | 2003021254 | 1/2003 |
| JP | 2004156771 | 6/2004 |
| JP | 2004293573 | 10/2004 |
| JP | 2007144468 | 6/2007 |
| WO | 2014081037 | 5/2014 |

OTHER PUBLICATIONS

"Search Report of Europe Counterpart Application", dated Feb. 16, 2018, p. 1-p. 8.

* cited by examiner

VALVE DEVICE

CROSS-REFERENCE TO RELATED APPLICATION

This application is a 371 application of the International PCT application serial no. PCT/JP2015/070761, filed on Jul. 22, 2015, which claims the priority benefit of Japan Patent Application No. 2014-161188, filed on Aug. 7, 2014. The entirety of the above-mentioned patent applications is hereby incorporated by reference herein and made a part of this specification.

TECHNICAL FIELD

The disclosure relates to a valve device. More specifically, the disclosure relates to a valve device provided with a back-flow prevention mechanism.

BACKGROUND ART

Patent Literature 1 discloses a valve device (1) including a valve body (30) for opening and closing outflow holes (13a, 13b) for fluid.

CITATION LIST

Patent Literature

[Patent Literature 1] Japanese Patent Laid-Open No. 2007-144468

SUMMARY OF THE DISCLOSURE

Technical Problem

A valve device has been generally known in which a valve body such as a slide valve is provided at an outflow hole for fluid and a flow passage is closed and opened by displacing the valve body. When a gap space is existed between contact faces of the valve body with the outflow hole, fluid may be leaked from the gap space. Therefore, in a case that the flow passage is closed, the valve body is required to closely contacted with the outflow hole over its entire periphery. As a method for closely contacting a valve body with an outflow hole, it is conceivable that a valve body is urged to the outflow hole side by an elastic member such as a plate spring or a coiled spring. In this case, when the elastic member presses the valve body more than required, an opening and closing operation of the valve body may be obstructed and thus an urging force of the elastic member is set so that the valve body is not floated from the contact face.

On the other hand, in a case that the fluid flowed out from the valve device is flowed backward by some cause, when a pressure of the fluid flowed backward is larger than an urging force of the elastic member, the valve body is pressed together with the elastic member and a gap space is generated between the contact faces of the valve body with the outflow hole. The fluid flowed backward is entered into the inside of the valve device through the gap space and, in addition, the fluid is flowed out through the inflow hole to the outside of the valve device. Further, in a case that the elastic member is bent beyond the yield point by being pressed by the fluid flowed backward, it may be occurred that the elastic member is damaged or plastically deformed, and a flow amount of the valve device may be unable to be controlled.

In view of the problem described above, the disclosure provides a valve device capable of reducing an entering amount of fluid which is flowed backward into an inside of the valve device and reducing a flowing-out amount through the inflow hole even when back-flow of the fluid is generated by some cause and, in addition, preventing damage of an elastic member configured to urge a valve body.

Means to Solve the Problems

To solve the above-mentioned problem, the disclosure provides a valve device including a drive source, a base having a valve seat face formed with an inflow hole and an outflow hole for fluid, a case body which is placed on a valve seat face side of the base to section a valve chamber together with the base, a first valve body configured to open and close the outflow hole, and a second valve body configured to open and close the inflow hole. An output part of the drive source, the first valve body and the second valve body are accommodated in the valve chamber, and the first valve body is a substantially columnar-shaped member whose one end face slides on a peripheral edge part of the outflow hole of the valve seat face. In addition, the first valve body is turned by driving force of the drive source to be switched between a state that the outflow hole is closed and a state that the whole or a part of the outflow hole is opened.

According to this structure, the first valve body is provided for an outflow hole and, in addition, the second valve body is provided for an inflow hole. Therefore, even in a case that fluid flowed backward pushes up the first valve body and enters into a valve chamber, the fluid flowed backward is kept in the valve chamber by closing the inflow hole by the second valve body and the fluid can be prevented from being flowed backward to the outside of the valve device through the inflow hole.

Further, it may be structured that the valve chamber further accommodates an elastic member which urges the first valve body, and the first valve body is urged to an outflow hole side by the elastic member and is pressed against the peripheral edge part of the outflow hole.

In a case that the first valve body is urged and pressed by an elastic member to the outflow hole side, the first valve body is closely contacted with the outflow hole and adjustment accuracy of a flow amount by the valve device is improved. Further, a fluid amount itself which can be flowed backward to the valve chamber is restricted by closing the inflow hole by the second valve body and thus influence on the elastic member due to the first valve body being pushed up is also reduced.

Further, it may be structured that the second valve body is a substantially columnar-shaped member whose one end face slides on a peripheral edge part of the inflow hole of the valve seat face, and the second valve body is turned by driving force of the drive source to be switched between a state that the inflow hole is closed and a state that the whole or a part of the inflow hole is opened.

In this case, it is desirably structured that the drive source is a stepping motor, an output part of the drive source is a rotor and a rotor pinion of the stepping motor, the first valve body and the second valve body are structured of common components, outer peripheral faces of the first valve body and the second valve body are formed with teeth parts engaged with the rotor pinion and, when the rotor pinion is rotated, the first valve body and the second valve body are turned in the same direction.

In a case that the second valve body using a common component to the first valve body is provided on the inflow hole side and its driving method is common, an opening and closing mechanism of the inflow hole and the outflow hole is simplified and efficiency of component management can be attained. In addition, flow amount control for the inflow hole can be performed with the same degree of accuracy as the flow amount control for the outflow hole and thus backflow prevention performance of the valve device is improved.

Further, it may be structured that combinations of opening and closing states of the inflow hole and the outflow hole by the first valve body and the second valve body includes a combination of a closed state of the inflow hole and an open state of the outflow hole simultaneously.

In a case that the first valve body is intentionally set in an open state when fluid is flowed backward, the elastic member can be prevented from being plastically deformed due to the first valve body being pushed up by the fluid which is flowed backward. However, this structure is effective only when a timing of back-flow is recognized in advance.

Further, it may be structured that the valve device is disposed inside a housing of a refrigerator, and the fluid is refrigerant of the refrigerator.

Even when pressure of refrigerant on the outlet side becomes high by some cause due to a variation of the pressure caused by liquefaction and vaporization of the refrigerant circulating through the refrigerator, the backflow of the refrigerant is prevented by the refrigerant valve in accordance with the disclosure.

Effects of the Disclosure

According to the valve device in accordance with the disclosure, the valve device can be provided which is capable of reducing an entering amount of fluid flowed backward into an inside of the valve device and a flowing-out amount through the inflow hole even when back-flow of the fluid is generated and, in addition, preventing damage of an elastic member configured to urge a valve body.

DESCRIPTION OF EMBODIMENTS (Entire Structure)

Figure 1A:
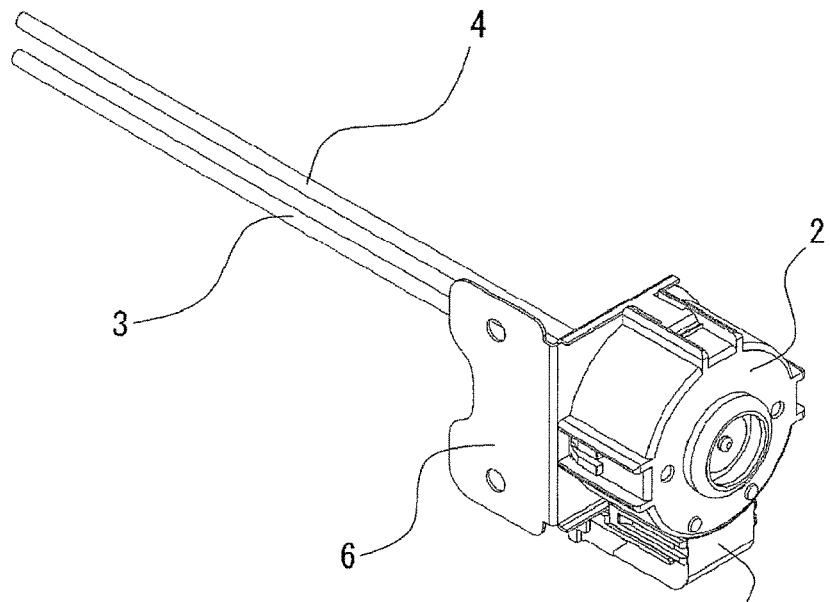
FIGS. 1(a) and 1(b) are perspective views showing a refrigerant valve device in accordance with an embodiment of the disclosure.
Figure 1B:
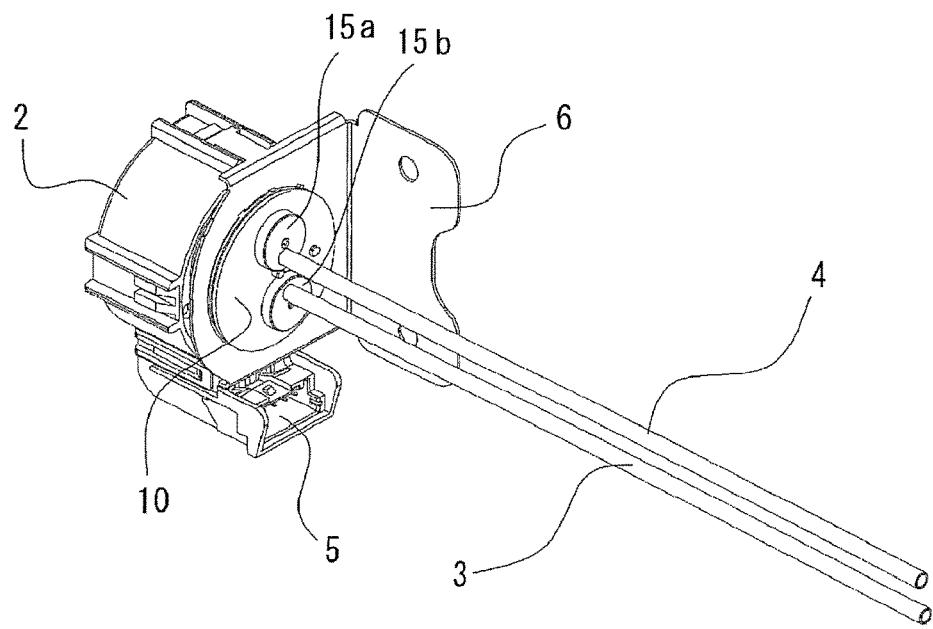

A refrigerant valve device which is an embodiment of a valve device in accordance with the disclosure will be described in detail below with reference to the accompanying drawings. FIGS. 1(a) and 1(b) are perspective views showing a refrigerant valve device 1 in accordance with an embodiment of the disclosure. A refrigerant valve device 1 is disposed between a compressor and a cooler in a refrigerant flow passage in an inside of a refrigerator, and a supply amount of refrigerant for cooling the inside of the refrigerator is regulated.

The refrigerant valve device 1 includes a valve main body 2, an inflow pipe 3 through which refrigerant that is fluid is flowed into the valve main body 2, an outflow pipe 4 through which the refrigerant is flowed out from the valve main body 2, a connector 5 configured to secure an electric connection with an external control device, and an attaching plate 6 configured to attach the refrigerant valve device 1 to an inside of the refrigerator. In the following descriptions, for convenience, extending directions of the inflow pipe 3 and the outflow pipe 4 are referred to as an upper and lower direction, the valve main body 2 is disposed on an upper side and the inflow pipe 3 and the outflow pipe 4 are disposed on a lower side.

Figure 2:
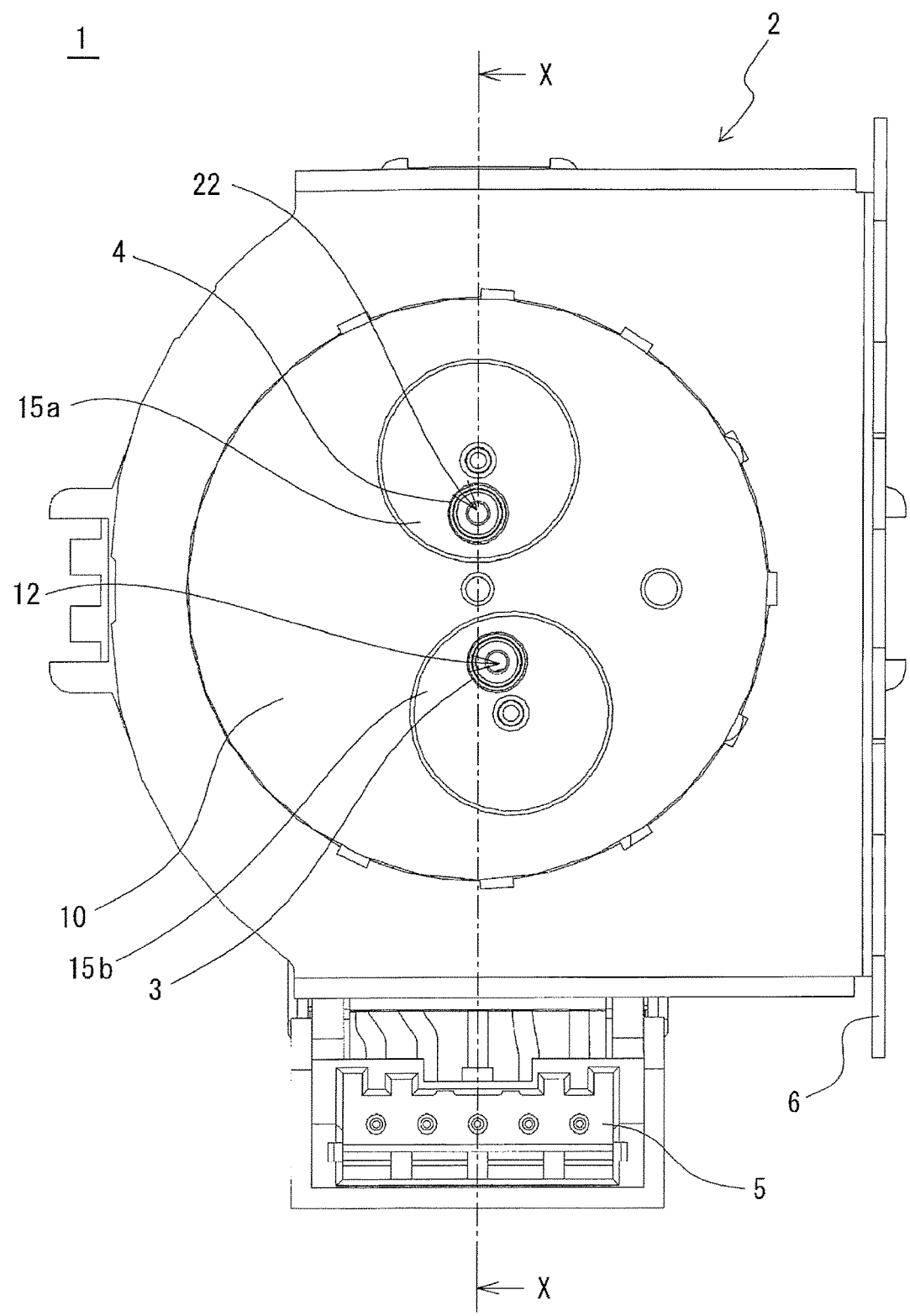
FIG. 2 is a bottom view showing a refrigerant valve device.

FIG. 2 is a view showing the refrigerant valve device 1 which is viewed from a side of the inflow pipe 3 and the outflow pipe 4. An under face of a base 10 in a disk shape is exposed in a bottom face of the valve main body 2. A valve seat 15a and a valve seat 15b are fitted to the base 10. The outflow pipe 4 is connected with a refrigerant outlet port 22 of the valve seat 15a and the inflow pipe 3 is connected with a refrigerant inlet port 12 of the valve seat 15b respectively.

Figure 3:
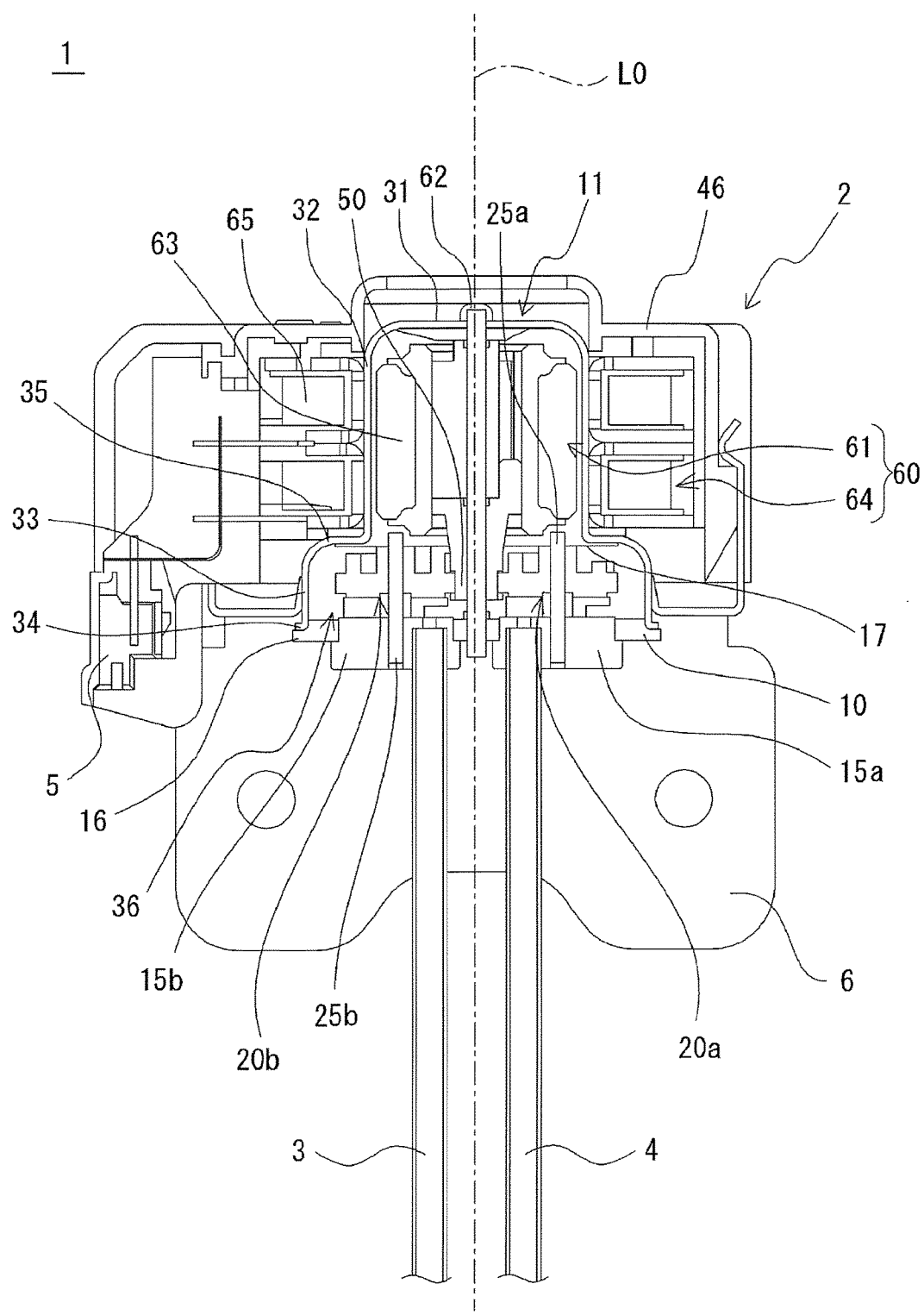
FIG. 3 is the "X-X" line cross-sectional view showing a refrigerant valve device in FIG. 2.

FIG. 3 is a cross-sectional view showing the refrigerant valve device 1 which is cut by the "X-X" line in FIG. 2. As shown in FIG. 3, the valve main body 2 includes the base 10 and a sealing cover 11 which is a cup-shaped case body and is placed so as to cover the base 10 from an upper side with its opening facing a lower side. The sealing cover 11 is, from an upper side to a lower side, provided with a circular bottom part 31, a small diameter tube part 32 which is extended from an outer circumferential edge of the bottom part 31 to a lower side, a large diameter tube part 33 having a diameter larger than the small diameter tube part 32, and a case side flange 34 which is enlarged from a lower end edge (opening edge) of the large diameter tube part 33 toward an outer peripheral side. A ring-shaped part 35 which is extended in a direction intersecting the center axial line "L0" of the base 10 is provided between the small diameter tube part 32 and the large diameter tube part 33 so as to connect the small diameter tube part 32 with the large diameter tube part 33. An outer circumferential edge of the base 10 is formed with a ring-shaped base side flange 16 whose plate thickness is made thin by lowering its upper face. The sealing cover 11 is fixed to the base 10 in a state that an upper side portion of the base 10 is inserted into an inner side of a lower end opening edge of the large diameter tube part 33 and the case side flange 34 is abutted with the base side flange 16 from an upper side. The base 10 is covered by the sealing cover 11 to section a valve chamber 36 together with the base 10.

The valve main body 2 is structured with a stepping motor 60 as a drive source by utilizing an inside and an outside of the sealing cover 11. A rotor 61 and a rotor pinion 50 which are output parts of the stepping motor 60 are disposed inside the valve chamber 36. The rotor 61 is rotatably supported by a rotor support shaft 62 whose upper end is fixed to the bottom part 31 of the sealing cover 11 and its lower end is fixed to a center of the base 10. An axial line of the rotor support shaft 62 is coincided with the center axial line "L0" of the base 10 and is extended in parallel with a support shaft 25a and a support shaft 25b which are attached to a valve seat 15*a* and a valve seat 15*b*. A ring-shaped drive magnet 63 is mounted on the rotor 61.

A stator 64 of the stepping motor 60 is placed on the ring-shaped part 35 of the sealing cover 11 and is disposed on an outer peripheral side of the sealing cover 11. The stator 64 is mounted with drive coils 65. The drive coils 65 face the drive magnet 63 of the rotor 61 through the small diameter tube part 32 of the sealing cover 11. The drive coil 65 is electrically connected with the connector 5 and the stepping motor 60 is driven and controlled by an external control device which is connected through the connector 5. The stator 64 and the connector 5 are accommodated on an inner side of an outer case 46.

(Valve Body Drive Mechanism)

Figure 4:
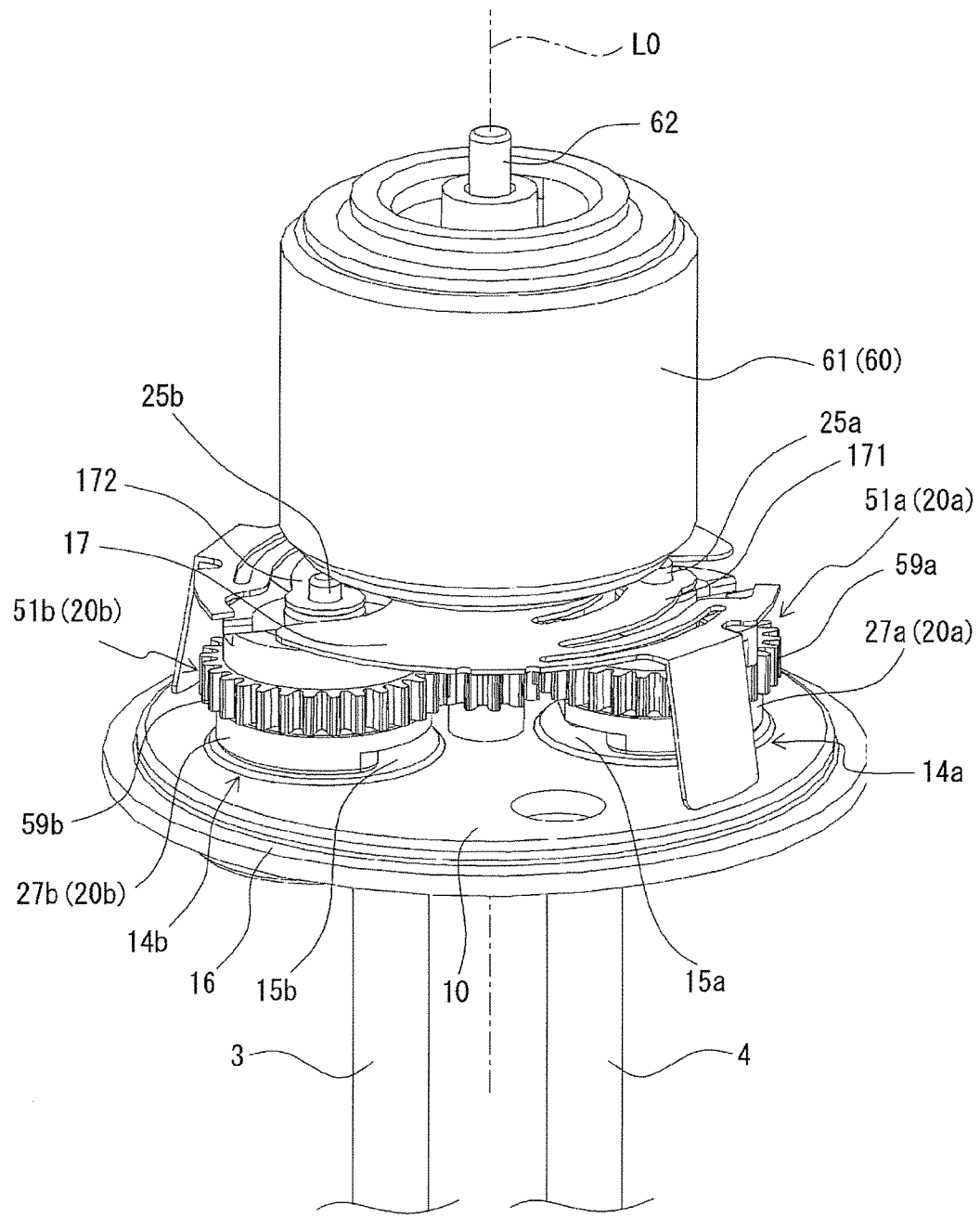
FIG. 4 is a perspective view showing a valve body drive mechanism.
Figure 5A:
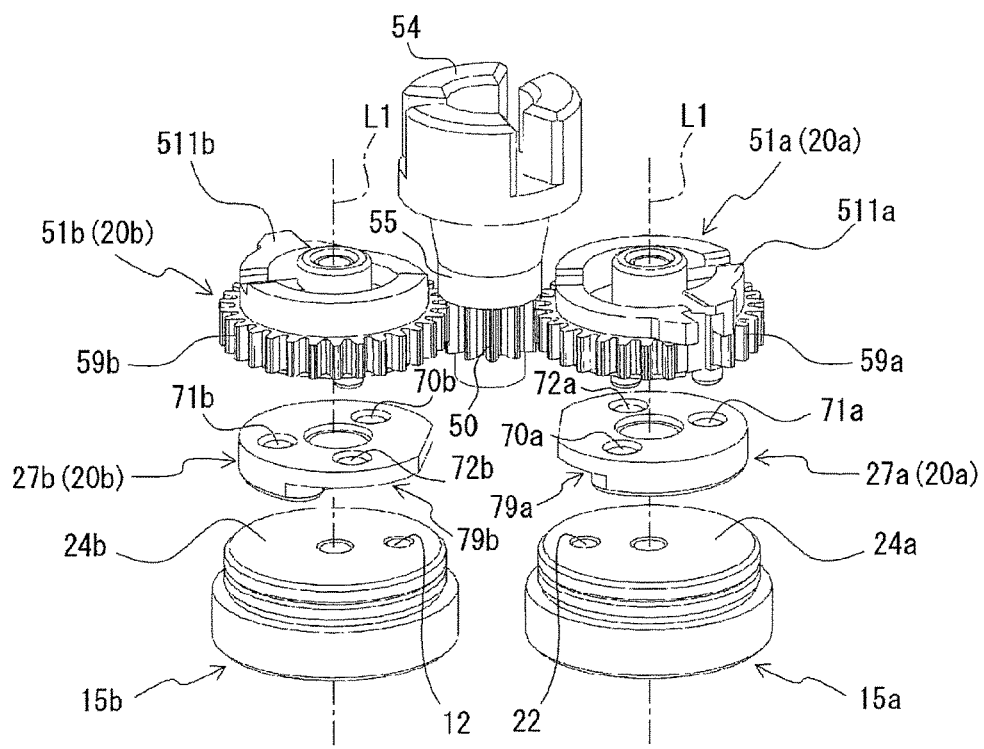
FIGS. 5(a) and 5(b) are exploded perspective views showing valve body drive mechanisms which are viewed from an upper side and a lower side.
Figure 5B:
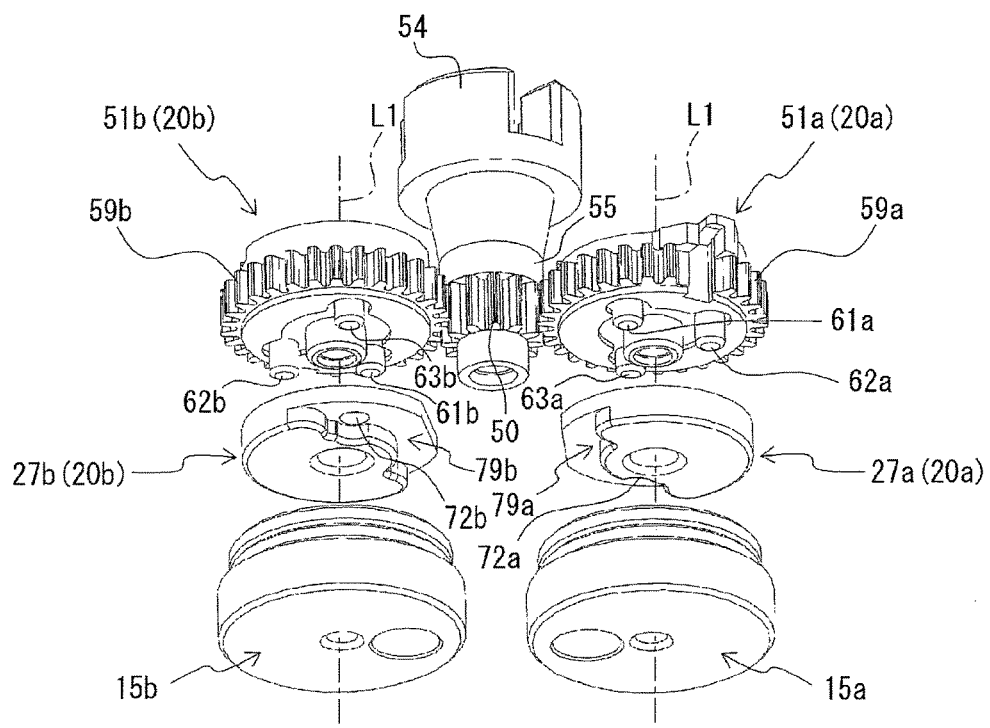

FIG. 4 is a perspective view showing a valve body drive mechanism. FIG. 5(*a*) is an exploded perspective view showing a principal part of the valve body drive mechanism which is viewed from an upper side, and FIG. 5(*b*) is its exploded perspective view which is viewed from a lower side. As shown in FIG. 4 and FIGS. 5(*a*) and 5(*b*), the valve body drive mechanism of the refrigerant valve device 1 in this embodiment includes a rotor 61 of the stepping motor 60 which is a drive source, a first valve body 20*a* provided on its outer peripheral face with a teeth part 59*a* which is engaged with a rotor pinion 50 provided in a pinion structure member 54 of the rotor 61, a valve seat 15*a* which is located on a lower side of the first valve body 20*a* and is provided with a valve seat face 24*a* on which a bottom face of the first valve body 20*a* is slid, a second valve body 20*b* which is provided with a teeth part 59*b* engaged with the rotor pinion 50 on its outer peripheral face, and a valve seat 15*b* which is located on a lower side of the second valve body 20*b* and is provided with a valve seat face 24*b* on which a bottom face of the second valve body 20*b* is slid.

The first valve body 20*a* and the valve seat 15*a*, and the second valve body 20*b* and the valve seat 15*b* are structured by using common components and the stepping motor 60 which is a drive source is also used in common. As a result, in comparison with a case that another valve body having a different structure is prepared as the second valve body 20*b*, an opening and closing mechanism of the refrigerant inlet port 12 and the refrigerant outlet port 22 is simplified and efficiency of the component management can be enhanced. Further, structures of the first valve body 20*a* and the valve seat 15*a* in the following descriptions are also naturally provided in the structures of the second valve body 20*b* and the valve seat 15*b*.

The base 10 is formed with a valve seat attaching hole 14*a* to which the valve seat 15*a* is fitted and a valve seat attaching hole 14*b* to which the valve seat 15*b* is fitted. Planar shapes of the valve seat 15*a* and the valve seat 15*b* are circular when viewed in axial line directions and their upper faces are formed to be the valve seat faces 24*a* and 24*b* which are flat. The refrigerant outlet port 22 which is an outflow hole of the refrigerant is formed at a position displaced from the center axial line "L1" of the valve seat 15*a*, and the refrigerant inlet port 12 which is an inflow hole of the refrigerant is formed in the valve seat 15*b* at a position substantially symmetric to the refrigerant outlet port 22 with the center axial line "L0" as a center. The valve seat faces 24*a* and 24*b* structure a part of an upper face of the base 10.

The first valve body 20*a* is a substantially columnar-shaped member whose one end face slides on a peripheral edge part of the refrigerant outlet port 22 of the valve seat face 24*a*. When the first valve body 20*a* is turned by driving force of the stepping motor 60, a state that the refrigerant outlet port 22 is closed and a state that the whole or a part of the refrigerant outlet port 22 is opened are switched from each other. The first valve body 20*a* is formed of a gear part 51*a* which is a turning member provided with a teeth part 59*a*, and a valve part 27*a* which is located on a lower side of the gear part 51*a* and is fixed to the gear part 51*a* in a state that its end face and the end face of the gear part 51*a* in the axial line direction are contacted with each other, and is integrally turned with the gear part 51*a*.

A bottom face of the valve part 27*a* and the valve seat face 24*a* are polished to be flat faces and can be closely contacted with each other without a gap space, and the refrigerant is prevented from leaking from a gap space between the sliding faces.

As shown in FIGS. 5(*a*) and 5(*b*), a projecting part 511*a* is provided which protrudes to an outer side in a radial direction at one position in a circumferential direction of the gear part 51*a*. The projecting part 511*a* is abutted with an abutted part 55 of the pinion structure member 54 from one side or the other side around the axial line "L1" when the gear part 51*a* is turned and reached to a predetermined angular position to restrict a turnable range of the gear part 51*a*.

An opposed face of the gear part 51*a* to the valve part 27*a* is formed with protruded parts 61*a*, 62*a* and 63*a* protruded to the valve part 27*a* side at equal intervals in the circumferential direction, and an opposed face of the valve part 27*a* to the gear part 51*a* is formed with recessed parts 70*a*, 71*a* and 72*a* to which the protruded parts 61*a*, 62*a* and 63*a* are fitted. The recessed part 72*a* is a through-hole penetrated to a cut-out part 79*a* and the protruded part 63*a* fitted to the recessed part 72*a* is caulked on the cut-out part 79*a* side. When the protruded part 63*a* is caulked, the gear part 51*a* is fixed to the valve part 27*a* without looseness and thus turning of the valve part 27*a* can be controlled by the stepping motor 60 with a high degree of accuracy. Further, calking work is performed on the protruded part 63*a* which is fitted to the recessed part 72*a* provided in the cut-out part 79*a* and thus scratches and deformation of the polished bottom face of the valve part 27*a* are prevented.

The cut-out part 79*a* and the cut-out part 79*b* in this embodiment are, similarly to the forming positions of the refrigerant outlet port 22 and the refrigerant inlet port 12, disposed at substantially symmetrical positions with the center axial line "L0" as a center. Therefore, when the stepping motor 60 is rotated, the refrigerant outlet port 22 and the refrigerant inlet port 12 are simultaneously opened and closed.

A support plate 17 which is a plate-shaped member whose upper face is substantially circular is disposed to an upper side of the first valve body 20*a* and the second valve body 20*b*. Two arm parts 171 and 172 which are elastic members are formed at symmetrical positions in a circumferential direction of the support plate 17 by cutting-out work. The arm parts 171 and 172 are extended along the circumferential direction of the support plate 17, and portions except their base end parts are separated from the support plate 17 to be elastically deformable in the upper and lower direction. Tip end parts of the arm parts 171 and 172 are formed in a little bulged circular shape. The support shafts 25*a* and 25*b* are respectively inserted into holes provided in their tip end parts and fix the positions of the support shafts 25*a* and 25*b* together with the valve seats 15*a* and 15*b*. In addition, the tip end parts are abutted with and urge upper faces of the first valve body 20*a* and the second valve body 20*b* and, as a result, the first valve body 20*a* is pressed against a peripheral edge part of the refrigerant outlet port 22 and the second valve body 20b is pressed against a peripheral edge part of the refrigerant inlet port 12.

Figure 6:
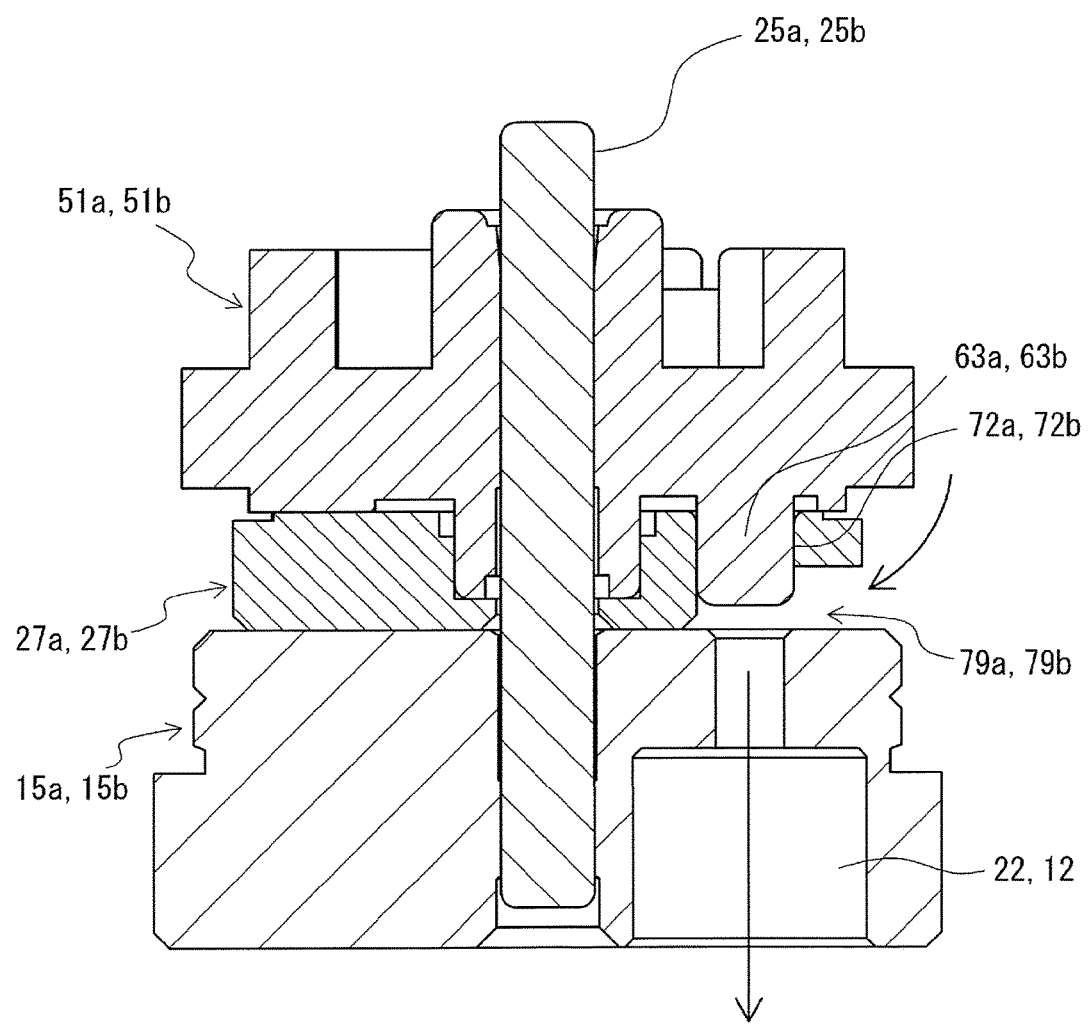
FIG. 6 is a cross-sectional view showing a flow passage communicating state of a valve body.

FIG. 6 is a cross-sectional view showing a state that the refrigerant outlet port 22 is opened by overlapping the cut-out part 79a of the valve part 27a with the refrigerant outlet port 22 in the axial line "L1" direction, and a state that the refrigerant inlet port 12 is opened by overlapping the cut-out part 79b of the valve part 27b with the refrigerant inlet port 12 in the axial line "L1" direction.

(Opening and Closing Operations of Valve Body)

As described above, the first valve body 20a and the second valve body 20b are structured of common components and the drive source is also used in common. Therefore, when the rotor 61 and the rotor pinion 50 are rotated by a certain amount, the first valve body 20a and the second valve body 20b are turned by the same angle in the same direction. In this embodiment, the first valve body 20a and the second valve body 20b are structured of common components and thus their turning angles are the same. However, when the number of teeth of the gear part 51a or the gear part 51b structuring the valve body is changed, the turning angles of the valve bodies with respect to a rotation amount of the rotor pinion 50 can be made different from each other.

Figure 7A:
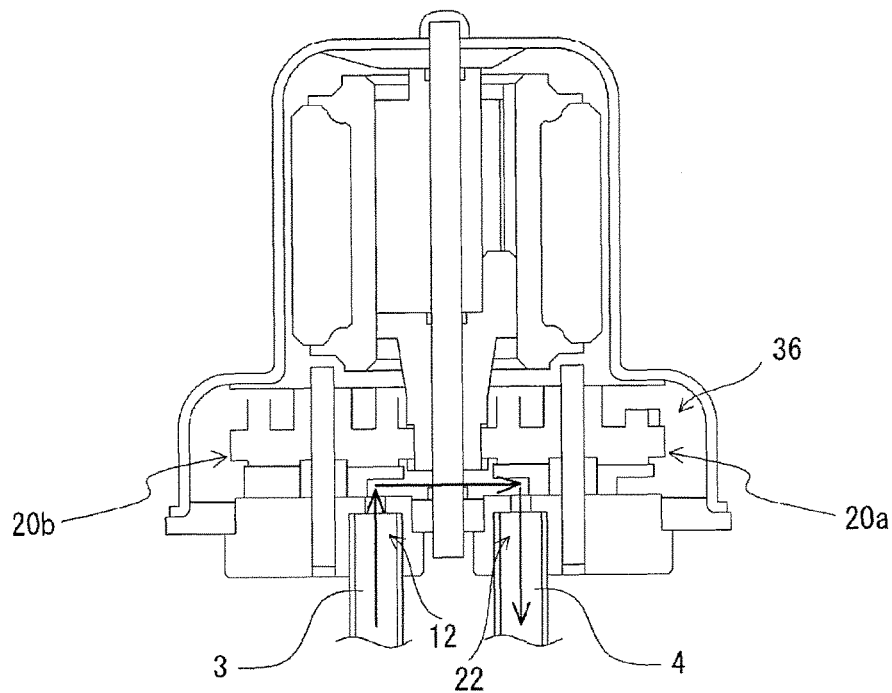
FIGS. 7(a) and 7(b) are cross-sectional views showing a refrigerant flow passage in a refrigerant valve device.

As shown in FIG. 7(a), when a flow passage of the refrigerant is to be communicated with each other, the stepping motor 60 is rotated to an angle at which both the first valve body 20a and the second valve body 20b are set in open states. As a result, the refrigerant moves upward through the inflow pipe 3, flows from the refrigerant inlet port 12 into the valve chamber 36, spreads out inside the valve chamber 36 in a horizontal direction, flows out from the refrigerant outlet port 22, and moves downward through the outflow pipe 4.

Figure 7B:
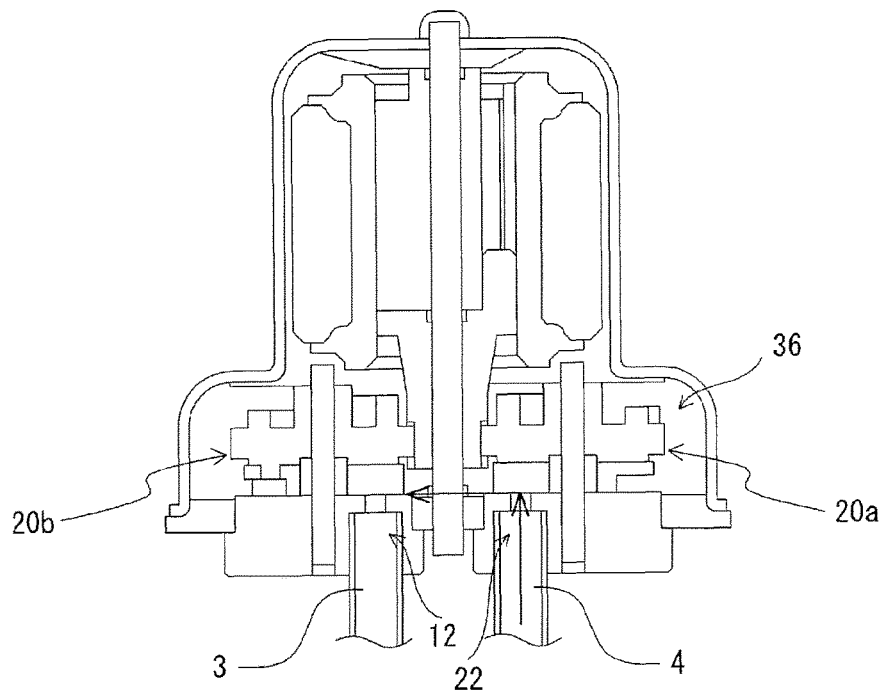

On the other hand, when the flow passage of the refrigerant is to be closed, as shown in FIG. 7(b), the stepping motor 60 is rotated to an angle at which both the first valve body 20a and the second valve body 20b are set in closed states. In this case, even when the refrigerant flows backward (moves upward through the outflow pipe 4) due to a variation of pressure and the like caused by liquefaction and vaporization of the refrigerant circulating through the refrigerator and the refrigerant flowed backward pushes up the first valve body 20a and enters the valve chamber 36 from the refrigerant outlet port 22, the refrigerant inlet port 12 is closed by the second valve body 20b. Therefore, the refrigerant entered into the valve chamber 36 is prevented from being flowed out through the refrigerant inlet port 12 to the outside of the refrigerant valve device 1.

Further, the refrigerant inlet port 12 is closed by the second valve body 20b which is structured of the same member as the first valve body 20a used in the refrigerant outlet port 22. Therefore, entering of the refrigerant to the refrigerant inlet port 12 can be prevented with the same degree of closed accuracy as a normal flow control.

In addition, the refrigerant inlet port 12 is closed and thus the valve chamber 36 becomes a sealed space. Therefore, an amount of the refrigerant which is capable of flowing into the valve chamber 36 is small. Accordingly, a resiliently bent amount of the arm part 171 caused by the first valve body 20a moved upward is restrained and possibility of damage and plastic deformation of the arm part 171 is reduced.

Figure 8:
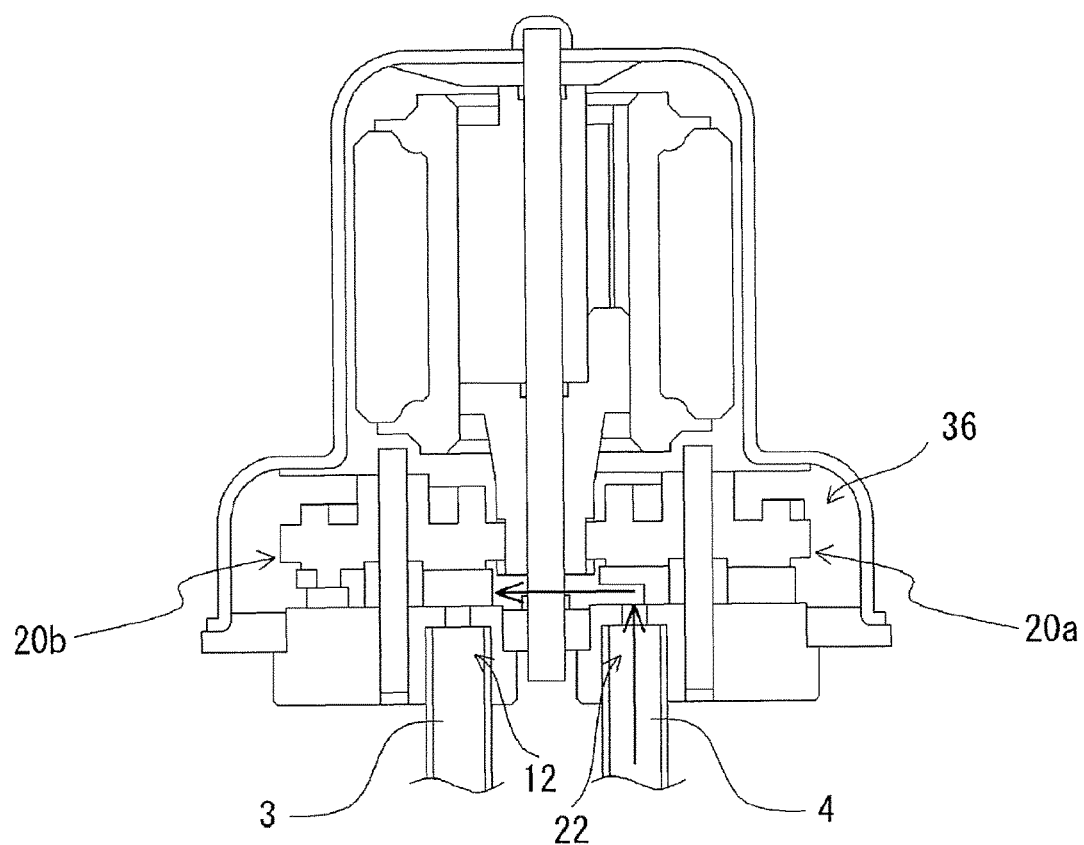
FIG. 8 is a cross-sectional view showing another combination of opening and closing states of valve bodies.

Combinations of opening and closing states of the refrigerant inlet port 12 and the refrigerant outlet port 22 in this embodiment are only two of both open states and both closed states because the cut-out parts 79a and 79b of the first valve body 20a and the second valve body 20b are located at substantially symmetrical positions with the center axial line "L0" as a center. However, as shown in FIG. 8, a combination of an open state of the first valve body 20a and a closed state of the second valve body 20b can be attained by changing a disposing angle of the valve part 27a or the valve part 27b, or by changing the number of teeth of the gear part 51a or the gear part 51b as described above to make a difference between turning angles of the first valve body 20a and the second valve body 20b with respect to a rotation amount of the rotor pinion 50.

In a case that a timing when the refrigerant is flowed backward is recognized in advance, it may be structured that the first valve body 20a is intentionally opened according to the back-flow. In this case, when the opening and closing states are set as described above, the first valve body 20a is prevented from being pushed upward by the refrigerant flowed backward and thus damage and plastic deformation of the arm part 171 can be prevented beforehand.

Although the disclosure has been shown and described with reference to a specific embodiment, the disclosure is not limited to the embodiment described above and various changes and modifications will be apparent to those skilled in the art from the teachings herein.

The invention claimed is:

1. A valve device comprising:
a drive source;
a base having a valve seat face formed with an inflow hole and an outflow hole for fluid;
a case body which is placed on a valve seat face side of the base to section a valve chamber together with the base;
a first valve body configured to open and close the outflow hole; and
a second valve body configured to open and close the inflow hole;
wherein an output part of the drive source, the first valve body and the second valve body are accommodated in the valve chamber;
wherein the first valve body is a substantially columnar-shaped member whose one end face slides on a peripheral edge part of the outflow hole of the valve seat face; and
wherein the first valve body is turned by driving force of the drive source to be switched between a state that the outflow hole is closed and a state that the whole or a part of the outflow hole is opened.

2. The valve device according to claim 1, wherein
the valve chamber further accommodates an elastic member which urges the first valve body, and
the first valve body is urged to an outflow hole side by the elastic member and is pressed against the peripheral edge part of the outflow hole.

3. The valve device according to claim 2, wherein
the second valve body is a substantially columnar-shaped member whose one end face slides on a peripheral edge part of the inflow hole of the valve seat face, and
the second valve body is turned by driving force of the drive source to be switched between a state that the inflow hole is closed and a state that the whole or a part of the inflow hole is opened.

4. The valve device according to claim 3, wherein
the drive source is a stepping motor,
an output part of the drive source is a rotor and a rotor pinion of the stepping motor,
the first valve body and the second valve body are structured of common components, outer peripheral faces of the first valve body and the second valve body are formed with teeth parts engaged with the rotor pinion, and when the rotor pinion is rotated, the first valve body and the second valve body are turned in the same direction.

5. The valve device according to claim 4, wherein combinations of opening and closing states of the inflow hole and the outflow hole by the first valve body and the second valve body include a combination of a closed state of the inflow hole and an open state of the outflow hole simultaneously.

6. The valve device according to claim 2, wherein the drive source is a stepping motor, an output part of the drive source is a rotor and a rotor pinion of the stepping motor, the first valve body and the second valve body are structured of common components, outer peripheral faces of the first valve body and the second valve body are formed with teeth parts engaged with the rotor pinion, and when the rotor pinion is rotated, the first valve body and the second valve body are turned in the same direction.

7. The valve device according to claim 1, wherein the second valve body is a substantially columnar-shaped member whose one end face slides on a peripheral edge part of the inflow hole of the valve seat face, and the second valve body is turned by driving force of the drive source to be switched between a state that the inflow hole is closed and a state that the whole or a part of the inflow hole is opened.

8. The valve device according to claim 7, wherein the drive source is a stepping motor, an output part of the drive source is a rotor and a rotor pinion of the stepping motor, the first valve body and the second valve body are structured of common components, outer peripheral faces of the first valve body and the second valve body are formed with teeth parts engaged with the rotor pinion, and when the rotor pinion is rotated, the first valve body and the second valve body are turned in the same direction.

9. The valve device according to claim 1, wherein combinations of opening and closing states of the inflow hole and the outflow hole by the first valve body and the second valve body include a combination of a closed state of the inflow hole and an open state of the outflow hole simultaneously.

10. The valve device according to claim 9, wherein the valve chamber further accommodates an elastic member which urges the first valve body, and the first valve body is urged to an outflow hole side by the elastic member and is pressed against the peripheral edge part of the outflow hole.

11. The valve device according to claim 10, wherein the second valve body is a substantially columnar-shaped member whose one end face slides on a peripheral edge part of the inflow hole of the valve seat face, and the second valve body is turned by driving force of the drive source to be switched between a state that the inflow hole is closed and a state that the whole or a part of the inflow hole is opened.

12. The valve device according to claim 1, wherein the valve device is disposed inside a housing of a refrigerator, and the fluid is refrigerant of the refrigerator.

* * * * *